PRESSEY & DUDLEY.
Shelling and Winnowing Apparatus.
No. 3,025. Patented March 30, 1843.
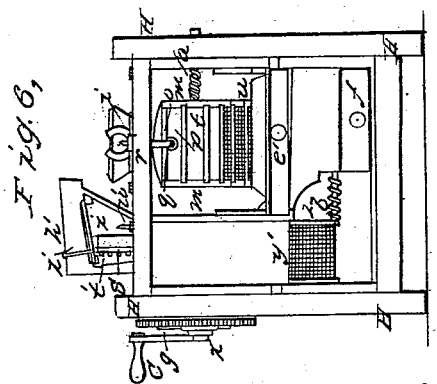
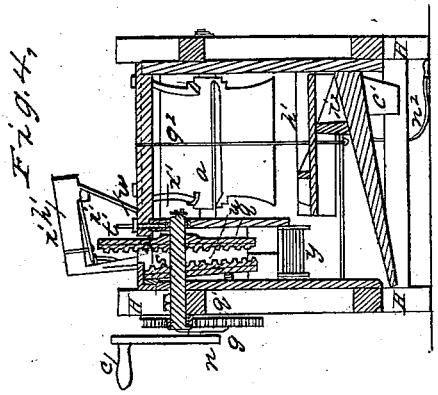
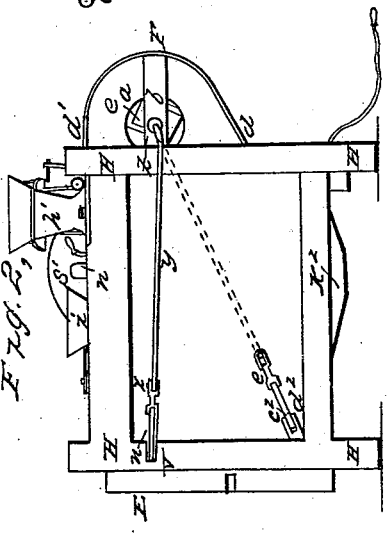
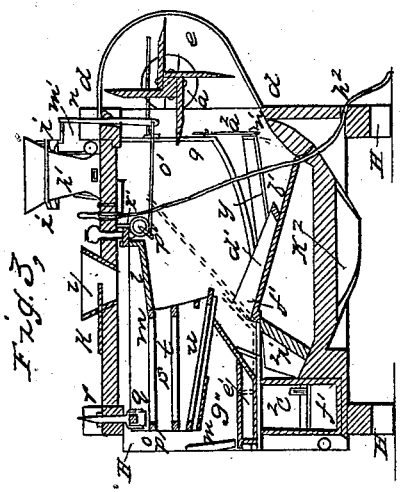
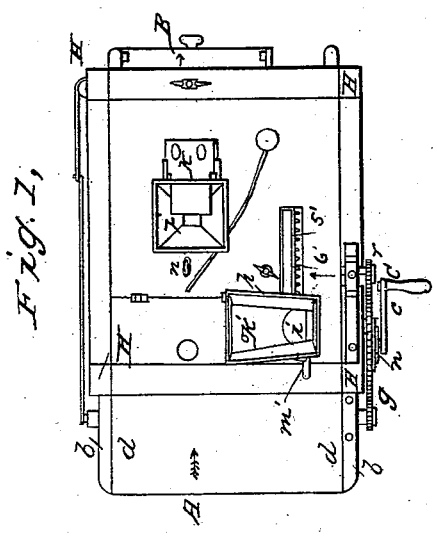
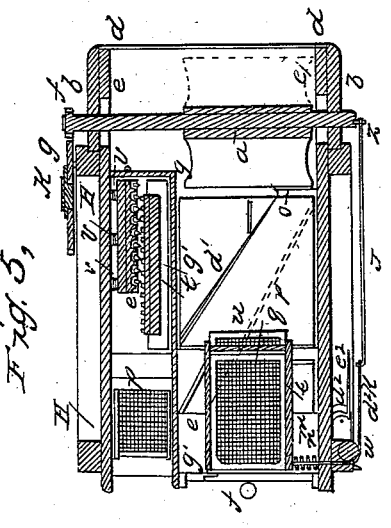

UNITED STATES PATENT OFFICE.

C. G. PRESSEY AND J. B. DUDLEY, OF ANDOVER, NEW HAMPSHIRE.

CORN-SHELLER.

Specification of Letters Patent No. 3,025, dated March 30, 1843.

*To all whom it may concern:*

Be it known that we, CARLOS G. PRESSEY and JAMES B. DUDLEY, both of Andover, in the county of Merrimack and State of New Hampshire, have invented new and useful improvements in machinery, the same being for winnowing threshed grain and for shelling and winnowing corn in the same machine, and that the following description, taken in connection with the accompanying drawings, hereinafter referred to, form a full and exact specification of the same, wherein we have set forth the nature and principles of our improvements, by which our machinery may be distinguished from other kinds, for a similar purpose, together with such parts or combinations as we claim and for which we solicit an exclusive property to be secured to us by Letters Patent.

The figures of the accompanying plate of drawings represent our improvements.

Figure 1 is a plan of the machine. Fig. 2 is a side elevation. Fig. 3 is a longitudinal vertical section in the line A B, Fig. 1. Fig. 4 is a transverse vertical section on the line C D, Fig. 1. Fig. 5 is a horizontal section taken in the plane of the line E F, Fig. 2; Fig. 6 being an end view or elevation of the rear of the machine.

H H H H in the various figures represent the framework which supports most of the various operative parts of our machine.

$a$, Figs. 3 and 4, is the wind or fan wheel, which is constructed in the usual manner, or as seen in the drawings, the journals of its shaft resting and revolving in suitable bearings in the projections $b$, $b$, from the main framework H H, &c. The fan wheel $a$, is inclosed or encompassed by a semi-cylindrical or curved casing $d$ $d$, shown in the several figures, which is tacked or otherwise secured to the end pieces $e$, $e$. This wheel is revolved by means of a cogged pinion $f$ on one of its journals, (see Fig. 1), which engages with a cogged wheel $g$, on the driving shaft $h$, Fig. 4, to which the motive power is applied, through the medium of a winch or crank $c$ as shown in Figs. 1 and 6, or by a drum or pulley in lieu of a crank, or any of the ordinary mechanical means.

$i$, Figs. 1, 2, 3, 6, is the hopper, shaped in the ordinary way and having a sliding bottom $k$, by which its mouth may be opened or closed at pleasure and the grain be fed in proper quantities to be winnowed. This hopper we shall call the winnowing hopper, in distinction to another which will be hereinafter described, and which feeds the ears of corn to the shelling apparatus. The grain to be winnowed falls from the hopper $i$, upon the conducting spout or receptacle $l$, Fig. 3, which is connected to the vibrating sieve frame $m$ $m$, said frame being suspended at one end, so as to turn freely, by means of the nut and screw at $n$, and the other end being sustained or hung so as to vibrate by means of the cross bar $o$, Figs. 3, 6, which rests upon the friction roller $p$, arranged in the loop $q$, which loop is confined to the framework H H, &c., by means of the screw and nut shown at $r$, Figs 1 and 6. Three or more rectangular wire sieves $s$, $t$, $u$, Fig. 3, are arranged in grooves in the sides of the sieve frame $m$ $m$. These sieves differ from each other in coarseness, the upper one or that designated by $s$, being the coarsest, while the lower one or that marked $u$ is the finest. The sieves $s$, $t$, are of the same size, and arranged nearly horizontally, while the sieve $u$ is somewhat longer than these and is inclined, as shown in Fig. 3.

The sieve frame $m$, $m$, is vibrated, (so as to sift the grain, while the wind produced by the fan wheel separates the chaff and foreign lighter articles from the same), by the band or strip of leather $v$ $v$, Figs. 2, 5 and 6, one end of which is attached to the side of the frame $m$ $m$, and which passes around one half of the pulley $w$ as shown in Fig. 2, and is hooked by the metallic loop $x$ to one end of the connecting rod $y$, the other end of said connecting rod being attached to a crank $z$ on one journal of the fan wheel as shown in Fig. 2. This arrangement of machinery, it will be seen, will serve to move the sieve frame $m$ $m$, in one direction on its friction roller $p$ while the elastic force of the spiral or helical spring $a'$, Fig. 6, will move or press it in an opposite one.

When the grain is received upon the lower sieve $u$, it slides from the same in front and drops upon the inclined plane $b'$, Figs. 3, 4, and 5, (which is made movable as will be hereinafter explained), on which it slides to the exit spout or pipe $c'$, Figs. 2, 5, a guiding ledge $d'$, on said inclined plane $b'$, conducting to the said spout $c'$. Whatever grain or other substance drops through the meshes of the lower sieve $u$ is received in the sliding box or drawer $e'$ shaped as seen in Figs. 3, 5, 6, while the heads of rye, wheat, oats or barley, which have not been thoroughly threshed drop from the rear of the upper sieves s, t, into the sliding drawer or box f', Figs. 3, 5, 6, the box e' being pushed in, to the position shown in dotted lines in Fig. 3.

The foregoing constitutes the description of that part of our machinery which is used for winnowing all kinds of grain, which are threshed preparatory thereto, we shall now proceed to describe the construction and operation of the corn shelling apparatus, (which is separated from that above described by the partition g' g' Figs. 3, 4, 5), together with such arrangements as enable us to perform both of the before named operations, as well as winnow the corn immediately after it is shelled in the same machine and by means of the same driving power, though not at the same time.

h' Figs. 1, 2, 3, 4, is the corn hopper in which any quantity of ears of corn may be placed, and which has a vibrating bottom i', whose motion feeds the ears to be shelled, as fast as may be required. The vibrating bottom i' is suspended and turns freely at one end on the pivot k' Fig. 1, while the other end is hung or rests on a string or wire l' l' as shown in Figs. 1, 4.

A horizontal arm m' loosely attached (so as to turn easily), to one side of the vibrating bottom i' as shown in Figs. 1, 3, is connected to the top of the pendulous lever n', Figs. 1 and 4, whose fulcrum is in the frame work A A as shown in Fig. 1. The lever n' is moved on its fulcrum, (thereby vibrating the hopper bottom i'), by means of the bent arm o' Fig. 3, which is connected at one end to the bottom of the lever n', and at the other to the crank p', on one end of the shaft q'. The shaft q' is revolved by means of a cogged pinion r', on its end, the teeth of which engage with the teeth of the gear wheel g on the driving shaft h.

s' is the shelling wheel, firmly fixed on the shaft q', the shelling face being a metallic plate t', properly secured to the part s' by screws or otherwise and having pyramidal shaped teeth or studs projecting horizontally therefrom, as shown in Figs. 1, 4, 5. Opposite the shelling wheel s' is the shelling plate u' having teeth or studs projecting from its face, precisely similar to those on the plate t' of the shelling wheel s'.

This plate u' is hung or attached to the inside of the framework H H, &c., as shown in Fig. 4, or in any other suitable manner so as to play a little at the bottom, and has one or more spiral or helical springs v' Fig. 4, placed behind it, which arrangement, it will be seen, provides for the various sizes of the ears which are to be shelled, as it allows the plate u' to separate more or less from the plate t' of the shelling wheel s', and thereby increase or diminish the space between said plates. This space may be regulated, at starting, by means of the nut and screw at w', the bottom part of the screw terminating in a loop x', which forms the bearing for one end or journal of the shaft q', and by raising or lowering this end of the shaft, by turning the nut at w' the space betwen the plates t', u', may be increased or diminished at pleasure.

The sides of the shelling chamber are sloped or inclined as shown in Figs. 3, 4, 6, so that the cobs and kernels, &c., as they are shelled, may slide and drop upon the vibrating inclined sieve y'. This sieve is hung at one end, so as to turn easily, by the projecting pin or stud z' Fig. 3, which rests in or upon the hook $a^2$ said hook depending from the front end of the shelling chamber. The other end is vibrated by means of the spiral spring $b^2$ and the band $c^2$, Fig. 6, which passes from the side of the sieve partly around the pulley $d^2$ and terminates in the metallic loop $e^2$, which is to be fastened or hooked to the connecting rod y, as shown by dotted line in Fig. 2, the loop x before described being disconnected from said rod y, when the machine is used for shelling and winnowing corn, it being understood that this operation and that of winnowing rye, oats, &c., cannot be carried on at the same time in our machine.

The above described arrangement of machinery for vibrating the sieve y' is precisely similar to, and operates in the same manner as that before described for vibrating the sieve frame m m.

In order to conduct the wind from the fan wheel a, under the sieve y', the movable inclined plane b' before mentioned (which turns with the square shaft f', to which it is attached at its rear end as shown in Fig. 3), is raised into the position denoted by dotted lines in Fig. 3, the raising and depressing of said inclined plane being accomplished by means of strings $g^2$, $h^2$, attached respectively to its upper and lower sides or faces as shown in Fig. 3. The diagonal partition $i^2$ along the bottom of the machine, shown partly in Fig. 3, and by dotted lines in Fig. 5, assists in conducting the wind to the sieve y', which wind separates the chaff, &c., from the corn. The cobs, chaff, &c., pass out at the rear of the machine, while the kernels of corn slip through the meshes of the sieve y' and drop on the bottom of the machine, which is made so as to operate as a tunnel, or with the parts converging toward the delivering pipe or spout $k^2$ Figs. 2, 3.

The movable inclined plane h' is a material feature of our invention, as it enables us to change the direction of the currents of wind created by the revolutions of the fan wheel in the manner and for the purpose above specified.

We deem it advisable to remark that the details of the shelling and winnowing apparatus, may be varied considerable from those we have described, but changes like these it is presumed will not affect our claims, which will be confined to the combinations of the shelling and winnowing machinery and the means by which said combination is rendered feasible.

Having thus described our improvements we shall claim—

The movable inclined plane, arranged substantially as herein before specified, for changing the direction of the currents of wind created by the fan wheel in the manner and for the purpose above described.

In testimony that the foregoing is a true description of our said invention and improvements we have hereto set our signatures this thirteenth day of December in the year eighteen hundred and forty two.

CARLOS G. PRESSEY.
    JAMES B. DUDLEY.

Witnesses:
 MOSES H. KING,
 PITTAN ELKINS.